United States Patent [19]
Bohannon et al.

[11] Patent Number: 6,122,645
[45] Date of Patent: Sep. 19, 2000

[54] SYSTEM AND METHOD FOR PHYSICALLY VERSIONING DATA IN A MAIN MEMORY DATABASE

[75] Inventors: Philip L. Bohannon, Mount Tabor, N.J.; Dennis W. Leinbaugh, Columbus, Ohio; Rajeev Rastogi, New Providence, N.J.; Srinivasan Seshadri, Powai, India; Abraham Silberschatz, Summit, N.J.; Sundararajarao Sudarshan, Powai, India

[73] Assignee: Lucent Technologies, Inc., Murray Hill, N.J.

[21] Appl. No.: 09/002,635

[22] Filed: Jan. 5, 1998

Related U.S. Application Data

[60] Provisional application No. 60/056,934, Aug. 25, 1997.

[51] Int. Cl.$^7$ ................................................. G06F 17/30
[52] U.S. Cl. ............................ 707/203; 707/204; 707/100
[58] Field of Search ........................... 700/203; 707/204, 707/100, 8, 1, 10, 203; 395/200.31, 182.04, 182.14

[56] References Cited

U.S. PATENT DOCUMENTS

| | | | |
|---|---|---|---|
| 5,204,958 | 4/1993 | Cheng et al. | 707/100 |
| 5,404,508 | 4/1995 | Konrad et al. | 707/203 |
| 5,442,784 | 8/1995 | Powers et al. | 707/100 |
| 5,627,961 | 5/1997 | Sharman | 395/182.04 |
| 5,657,440 | 8/1997 | Micka et al. | 392/182.14 |
| 5,687,361 | 11/1997 | Sarkar | 707/1 |
| 5,701,457 | 12/1997 | Fujiwara | 707/8 |
| 5,832,519 | 11/1998 | Bowen et al. | 707/203 |
| 5,852,715 | 12/1998 | Raz et al. | 395/200.31 |

OTHER PUBLICATIONS

Lyon, "Tandem's Remote Data facility", 35th IEEE Compcon, pp. 562–567, 1990.

Burkes et al., "Design Approaches for Real–time Transaction Processing Remote Site Recovery", 35th IEEE compcon, pp. 568–572, 1990.

*Primary Examiner*—Thomas G. Black
*Assistant Examiner*—Frantz Coby

[57] ABSTRACT

For use with a database of data records organized into components, the database stored in a memory, a processing system for, and method of, physically versioning the database. In one embodiment, the processing system includes: (1) a component copier that creates a physical copy of an original component to be affected by an update transaction to be applied to the database, and that causes pointers in nodes of the physical copy to point to other nodes in the physical copy, (2) a data updater, associated with the component copier, that applies the update transaction to the physical copy to create therefrom a new physical version, the original component remaining unaffected by the update transaction and (3) a pointer updater, associated with the data updated, that employs an atomic word write to revise a component pointer, associated with the database, to cause the pointer to point to the new physical version.

17 Claims, 5 Drawing Sheets

SYSTEM AND METHOD FOR PHYSICALLY VERSIONING DATA IN A MAIN MEMORY DATABASE

CROSS-REFERENCE TO RELATED APPLICATION

This applications claims the benefit of U.S. Provisional Application Ser. No. 60/056,934, filed on Aug. 25, 1997, and entitled "System and Method for Physically Versioning Data in a Main Memory Database," commonly assigned with the present invention and incorporated herein by reference.

TECHNICAL FIELD OF THE INVENTION

The present invention is directed, in general, to database management systems and, more specifically, to a system and method for physically versioning data records in a main memory database.

BACKGROUND OF THE INVENTION

Many contemporary application tasks use database systems to store, retrieve and, even, process data. Database systems typically include a database manager ("DBM") and a database (i.e., a data repository). A DBM is a control application that supervises or manages interactions between application tasks and the database. Such supervision and management vary among DBMs based on a given DBM's sophistication and the database's intended use. Arguably, two of the most important DBM functions are those that ensure data recovery (in response to a database crash) and data integrity.

Data recovery involves rebuilding at least part of a database after all or part of its data is corrupted/lost, such as caused by a power outage, a program crash, or the like. If certain data is corrupted/lost, the DBM will "recover" at least the portion affected; recovery is usually to a last known valid or "uncorrupt" state. When database recovery efforts are undertaken, extended time delays are expected.

With respect to data integrity, however, time delays or latencies (time differential between a request for data and actual receipt of the same) are largely intolerable. Early database systems were divided among main (volatile) and disk (non-volatile) memory; DBMs and application tasks resided, at least in part, in volatile memory, while the database was stored in non-volatile memory. Such systems, and their "disk"-based successors, have failed to meet performance requirements of contemporary high-speed information management systems ("IMSs," such as communications switching systems). This has occurred, for example, when the use of data-integrity techniques exacerbated the latencies inherent to non-volatile transactions (such as access, retrieval, modification, index and copy transactions), exacerbated by data integrity techniques.

Contemporary IMSs demand fast and predictable transaction response times, particularly for transactions that do not modify or otherwise change a given database ("read-only transactions"). One popular methodology maps the entire database into volatile memory (a "main memory database") to improve IMS performance, particularly transaction response times. Unfortunately, to ensure data integrity, conventional main memory DBMs delay the processing of transactions that modify portions of the database (termed "update transactions") until other transactions with respect to such portions are processed. For instance, suppose that two transactions simultaneously attempt to access the same file, entry, field or the like (collectively, a "data record"). A contemporary DBM may ensure data integrity by preventing one update transaction from modifying the data record while the other relies on the contents of the data record.

However, database modifications tend, in general, to affect only a small number of data records. Typically, a DBM monitors a status of a data record that is the subject of an update transaction. The DBM grants a right to modify the same to the update transaction only when the data record is free (not otherwise being used or relied upon by another transaction). This right is commonly either a lock (i.e., control mechanism that prevents other transactions from getting to the same data records) or a latch (i.e., a semaphore—a control mechanism that sends a message to other transactions indicating that another transaction is modifying or changing these data records), causing other transactions to "wait" to see the affected data record while the update transaction modifies the same.

Update transactions tend to be multi-step processes. For this reason, it is quite common for a DBM to require a given update transaction to wait between process steps while other update transactions complete. While waiting, the update transaction retains its data record locks or latches; these other update transactions also maintain their data record locks and latches. This can lead to interdependency conflicts that require DBM intervention to resolve.

Therefore, while main memory databases offer increased speed, the above-described "waits" and conflicts provide a source of unpredictability to transaction throughput and database response time. This is particularly true for read-only transactions. These transactions require a simple "look and see" database access that may be severely delayed because of the aforesaid "waits" and conflicts.

Contemporary control methodologies reduce conflicts between update and read-only transactions by giving the latter consistent, but "old" or out-of-date, views of certain data records or data record types. This is commonly referred to as multi-versioning, in which DBMs retain or archive multiple versions of recently updated data records for use by read-only transactions. Multi-version DBMs use time stamps to serialize read-only and update transactions, and, more recently, to serialize read-only transactions with respect to update transactions. These DBMs require update transactions to perform locking to serialize themselves with respect to other update transactions, but not with respect to read-only transactions.

Currently, read-only transactions are forced to access data structures by obtaining latches and, in some instances, locks. Unfortunately, such read-only transactions may be time-critical. Waiting for latches or locks can introduce delays of unpredictable length into the access, degrading database performance to an unacceptable level. Therefore, a need exists in the art to conduct read-only transactions on a database in a shorter, more predictable period of time. More specifically, what is needed in the art is a way of removing the reliance of read-only transactions on latches or locks.

SUMMARY OF THE INVENTION

Discussed above are certain deficiencies of the prior art relating to a database, stored in a memory and that comprises data records organized into components. To address the above-described deficiencies of the prior art, the present invention provides, with such a database, a processing system for, and method of, physically versioning the database. In one embodiment, the processing system includes: (1) a component copier that creates a physical copy of an original component to be affected by an update transaction to be applied to the database and that causes pointers in nodes of the physical copy to point to other nodes in the physical copy, (2) a data updater, associated with the component copier, that applies the update transaction to the physical copy to create therefrom a new physical version, the original component remaining unaffected by the update transaction, and (3) a pointer updater, associated with the data updater, that employs an atomic word write to revise a component pointer, associated with the database, to cause the pointer to point to the new physical version.

The present invention therefore accomplishes physical versioning by creating a copy of an entire component, applying the update transaction to the component, and tying the component to the remainder of the database by way of an atomic word write. "Component" is defined, for purposes of the present invention, as a connected set of nodes in the database. Given an update transaction, the component includes all nodes that such update transaction, if applied, would affect and all nodes necessary to connect the affected nodes. By processing update transactions in this manner, subsequent transactions (both update and read-only) to be applied to the database can traverse the database without having to acquire latches to do so. This can significantly decrease the amount and variability of time required to process a read-only transaction.

The present invention further introduces a physical ager and a method of physically aging the components. This aging method de-allocates memory space occupied by the original component after there have been applied to the database all transactions having a physical time stamp less than a time stamp associated with the update transaction.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings wherein like numbers designate like objects, and in which.

DETAILED DESCRIPTION

Before undertaking a detailed description of an advantageous embodiment of the present invention, it may be beneficial to discuss the general concept of creating and maintaining multiple versions of data records, known in the art as multi-versioning or, simply, "versioning."

Note that the phrase "data record," as used herein, is defined broadly to mean any file, entry, record, field, item and other data associated with at least one database (or any suitable data repository for that matter). Furthermore, while the following discussion relates to databases residing in the main memory of a computer, those skilled in the art should understand that the broad principles and scope of the present invention extend to databases contained in other-than-main memory, such as secondary or mass storage units.

In main memory database systems supporting versioning, transactions are commonly classified as one of read-only (e.g., a transaction that "reads" data records) or update (e.g., a transaction that "updates" data records or, more broadly, wants access to a current version of a particular data record). When an update transaction is executed, it most often updates a given data record—a "current" version of the data record is archived, becoming a most recent "past" version thereof, and the newly updated version becomes the new "current" (or successor) version of the same. Update transactions commonly use a two step locking protocol—a lock is obtained before any modification, or other change, is made to the data record; the data record is modified, making it the most recent past version and creating the new current version. Finally, when the update transaction commits, the data record affected is assigned a time stamp and the lock held by the update transaction is released.

At execution, a read-only transaction is commonly assigned a time stamp. A given read-only transaction reads the version of a particular data record whose time stamp is less than or equal to its time stamp.

Figure 1:
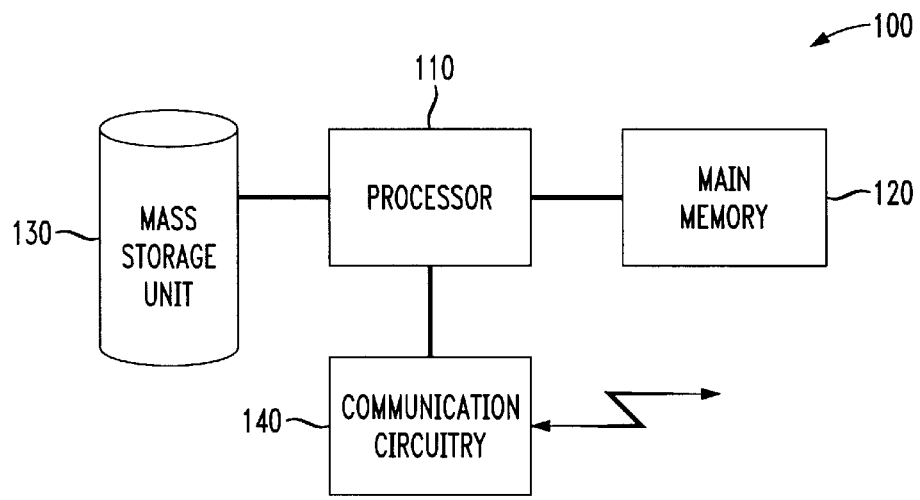
FIG. 1 illustrates a block diagram of a computer system employable as an environment within which the present invention can operate.

Referring initially to FIG. 1, illustrated is a block diagram of a computer system employable as an environment within which the present invention can operate. The computer system, generally designated 100, is illustrated as including a processor 110, volatile main memory 120 and a nonvolatile, mass storage unit 130. The computer system is further illustrated as including data communication circuitry 140 that allows data to be transmitted from, or received into, the computer system 100.

The present invention is advantageously practiced in conjunction with a database stored in the volatile main memory 120. Those skilled in the art are familiar with main memory database structures and uses. However, the present invention may also be employed in conjunction with a database stored in the nonvolatile, mass storage unit 130.

The computer system 100 is intended to represent a wide array of computing platforms. Accordingly, the computer system 100 may be a mainframe, minicomputer or personal computer ("PC") or may represent a logically-associated group of computers, such as a cluster or network. The present invention is not limited whatsoever to a particular class of computing platform.

Figure 2A:
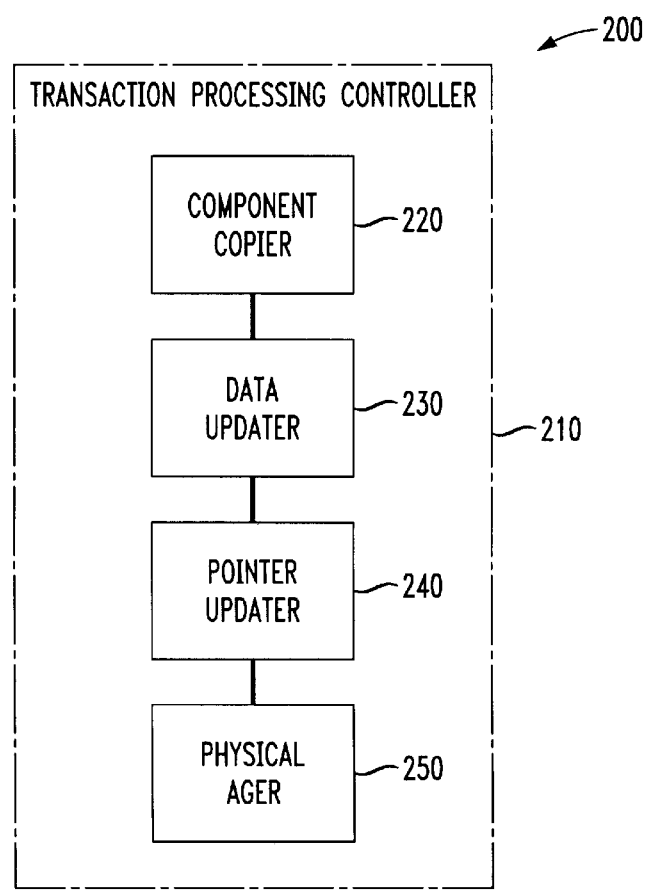
FIG. 2A illustrates a block diagram of one embodiment of a processing system that can be employed physically to version a database of data records according to the principles of the present invention.

Turning now to FIG. 2A, illustrated is a block diagram of one embodiment of a main memory database management system that can be employed physically to version a database of data records according to the principles of the present invention. The processing system, generally designated 200, is illustrated as including a transaction processing controller 210 that, itself, includes a component copier 220, a data updater 230, a pointer updater 240 and a physical ager 250.

The component copier 220 is used to create a physical copy of an original component that would be affected by an update transaction to be applied to the database. Once the component copier 220 has made the physical copy, the component copier 220 causes pointers in nodes of the physical copy to point to other nodes in the physical copy. This ensures that the physical copy has the same internal relative pointer structure as the original component.

The data updater 230 is associated with the component copier 220 and applies the update transaction to the physical copy. Application of the update transaction transforms the physical copy into a new physical version. In applying the update transaction, however, the data updater does not revise the original component whatsoever; the original component therefore remains unaffected by the update transaction.

The pointer updater 240 is associated with the data updater 230 and employs an atomic word write to revise a component pointer, associated with the database, to cause the pointer to point to the new physical version. Those skilled in the art are familiar with atomic word writes, an operation universally supported in standard operating system architectures. By employing atomic word writes, both subsequent update and read-only transactions are allowed to traverse the data structure of the database without having to acquire latches to read the various pointers in the nodes thereof. By freeing the update and read-only transactions from having to acquire latches, performance of the read-only transactions is decoupled from performance of the update transactions, depending instead upon available processor resources and rendering response times shorter and more predictable.

The component pointer may be associated with a parent of the original component. Alternatively, if the original component is at the root of a tree, the pointer is the root pointer for the tree as a whole. In one embodiment of the present invention, the pointer is located without the original component. For example, if the original component is not at the root of the tree, the pointer is located in the original component's parent.

In the illustrated embodiment, the pointer updater 240 does not update the component pointer until the data updater 230 has fully executed the update transaction. This precludes a read-only transaction to be applied to the database from traversing the new physical version until the update transaction is fully executed. Thus, consistency of operation is maintained for the read-only transaction. Alternatively, if the database has other than a tree organization, the read-only transaction may traverse the new physical version before the update transaction has been fully executed thereon, as long as the new physical version is complete enough to allow the read-only transaction to traverse it.

The physical ager 250 is associated with the pointer updater 240. The physical ager 250 de-allocates memory space occupied by the original component only after there have been applied to the database all transactions having a physical time stamp less than a time stamp associated with the update transaction. This ensures that out-of-date original components remain intact until all of the transactions requiring their presence are fully applied.

Figure 2B:
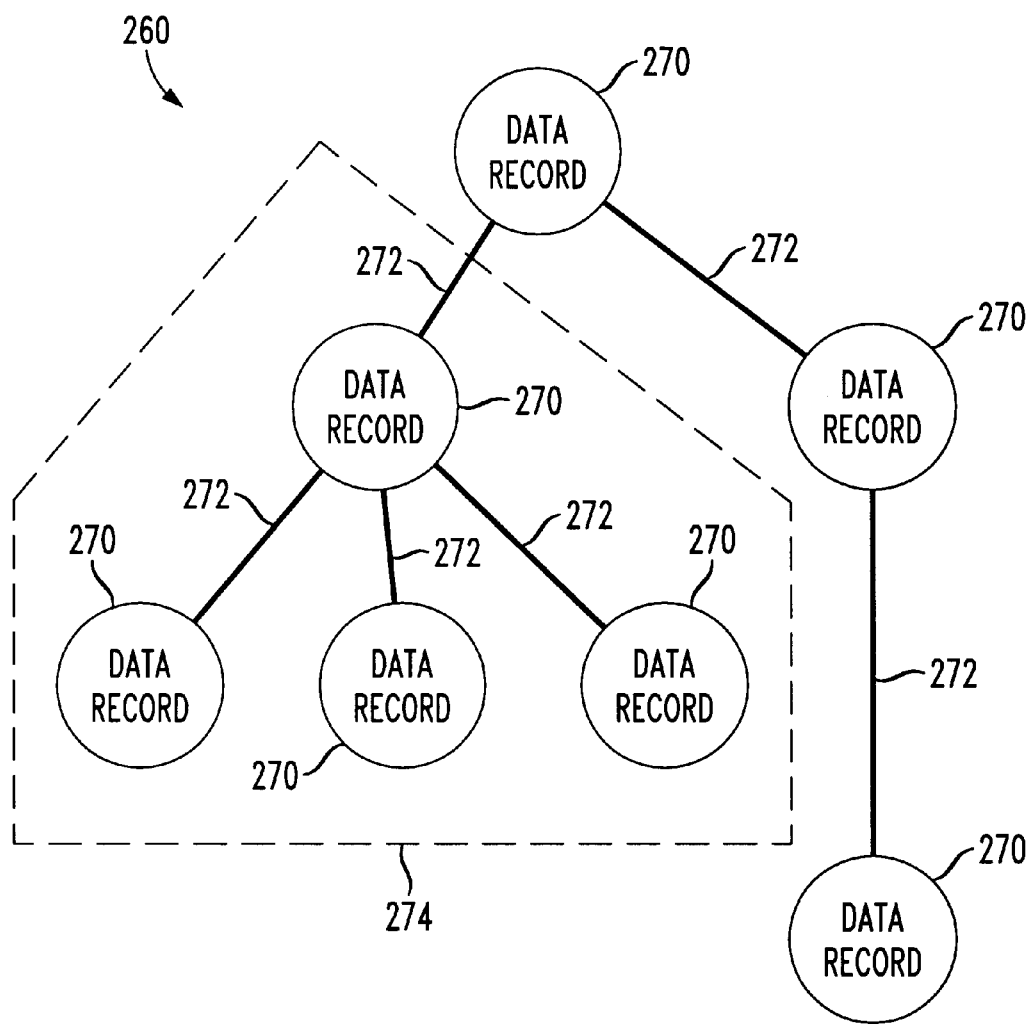
FIG. 2B illustrates a block diagram of a database on which the processing system of FIG. 2A can operate.

Turning now to FIG. 2B, illustrated is a block diagram of a database on which the processing system of FIG. 2A can operate. The database, generally designated 260, is illustrated as including a plurality of data records 270 (which may be thought of as nodes), each of which being linked to the other by pointers 272 (which may be thought of as defining edges coupling the nodes). The present invention makes physical copies of at least portions of the database, depending upon the content of update transactions that are received.

FIG. 2B also shows an exemplary component 274, representing a collection of nodes that a particular update transaction may affect.

In the illustrated embodiment of the present invention, the database 260 is organized as a tree. In a more specific embodiment, the tree is selected from the group consisting of: (1) a B-tree, (2) a T-tree and (3) a hash table. Those skilled in the art are familiar with tree structures for databases in general, so the discussion that follows will provide an example and therefore be limited to T-trees and operation of the present invention in conjunction therewith.

T-trees are as a storage-efficient data structure for main memory databases and are based on well-known AVL trees (AVL is an abbreviation of the names of the discoverers of such trees). Like AVL trees, the height of each node's subtrees may differ by at most one. A T-tree differs from an AVL tree in that each node, instead of storing a single key value, stores multiple key values in a sorted order. The leftmost and the rightmost key value in a node define the range of key values contained in the node. Thus, the left subtree of a node contains only key values less than the leftmost key value, while the right subtree contains key values greater than the rightmost key value in the node. A node with both a left and a right child is referred to as an internal node, a node with only one child is referred to as a semi-leaf, and a node with no children is referred to as a leaf. To keep occupancy high, every internal node has a minimum number of key values that it must contain (typically k-2, if k is the maximum number of keys that can be stored in a node). However, there is no occupancy condition on the leaves or semi-leaves.

Searching for a key value in a T-tree is relatively straightforward. For every node, a check is made to see if the key value is bounded by the leftmost and the rightmost key value in the node; if this is the case, then the key value is returned if it is contained in the node (otherwise, the key value is not contained in the tree). Otherwise, if the key value is less than the leftmost key value, then the left child node is searched; otherwise the right child node is searched. The process is repeated until either the key is found or the node to be searched is null.

Insertions into, and deletions from, the T-tree are a bit more complicated. For insertions, first a variant of the search described above is used to find the node that bounds the key value to be inserted. If such a node exists, then, if there is room in the node, the key value is inserted into the node. If there is no room in the node, then the key value is inserted into the node and the leftmost key value in the node is inserted into the left subtree of the node (if the left subtree is empty, a new node is allocated and the leftmost key value is inserted into it). If no bounding node is found then let N be the last node encountered by the failed search and proceed as follows: if N has room, the key value is inserted into N; otherwise, it is inserted into a new node that is either the right or left child of N depending on the key value and the leftmost and rightmost key value in N.

Deletion of a key value begins by determining the node containing the key value, and the key value is deleted from the node. If deleting the key value results in an empty left node, then the node is deleted. If the deletion results in an internal node or semi-leaf containing fewer than the minimum number of key values, then the deficit is made up by moving the largest key in the left subtree into the node, or by merging the node with its right child.

In both insert and delete, allocation/de-allocation of a node may cause the tree to become unbalanced and rotations may need to be performed. (The heights of subtrees in the following description include the effects of the insert or delete.) In the case of an insert, nodes along the path from the newly allocated node to the root are examined until (1) a node for which the two subtrees have equal heights is found (in this case no rotation needs to be performed) or (2) a node for which the difference in heights between the left and the right subtrees is more than one is found and a single rotation involving the node is performed. In the case of delete, nodes along the path from the de-allocated node's parent to the root are examined until a node is found whose subtree heights now differ by one. Furthermore, every time a node whose subtree's heights differ by more than one is encountered, a rotation is performed. Note that de-allocation of a node may result in multiple rotations.

For further information pertaining to T-trees in particular, see, *A Study of index Structures for Main Memory Database Management Systems*, Proceedings of the Conference on Very Large Databases, pages 294–303 (August 1986). The present invention advantageously functions with databases having conventional tree structures. However, the present invention also operates with non-tree structures, such as double-linked lists and B-trees having linked leaf nodes.

Figure 3:
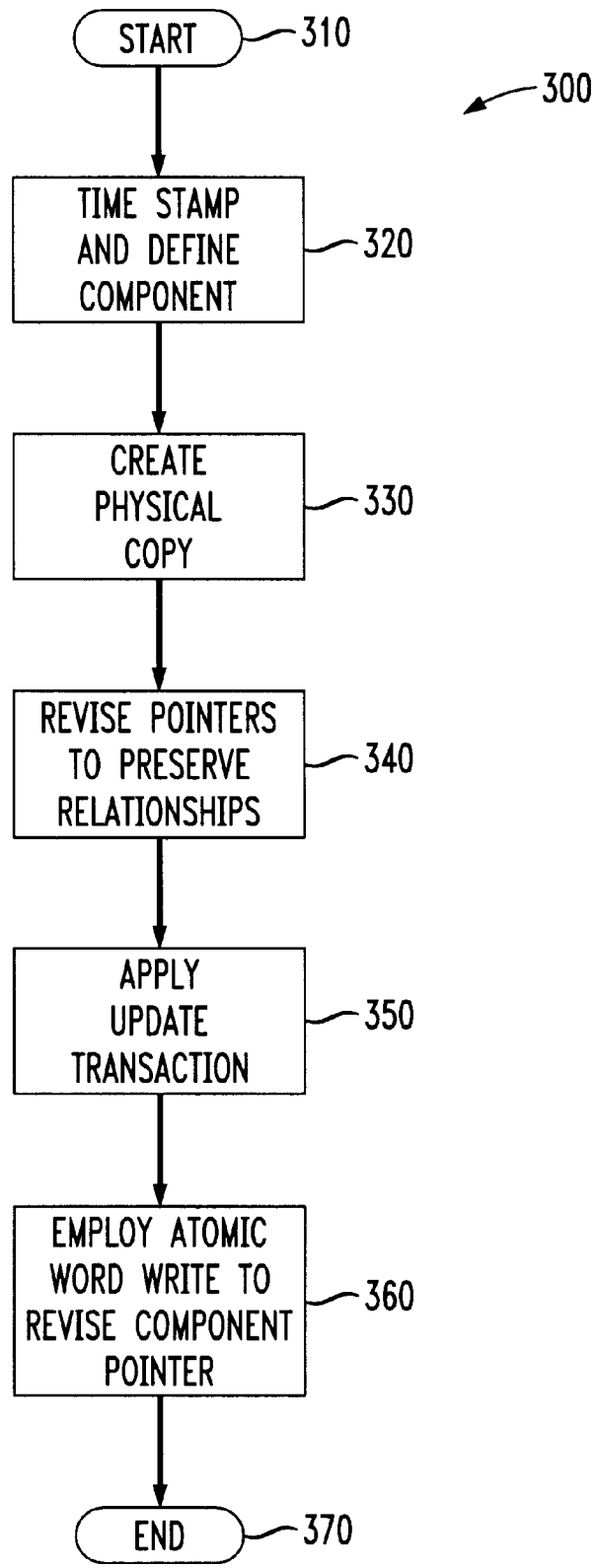
FIG. 3 illustrates a flow diagram of one embodiment Of a method of physically versioning a database of data records according to the principles of the present invention.

Turning now to FIG. 3, illustrated is a flow diagram of one embodiment of a method of physically versioning a database of data records according to the principles of the present invention. The flow diagram, generally designated 300, begins in a start step 310, wherein an update transaction is received into the transaction processing controller (210 of FIG. 2A). In a step 320, the component copier (220 of FIG. 2A) time stamps the update transaction and determines which nodes in the database would be affected by the update transaction, thereby defining the relevant original "component."

The component copier then creates (in a step 330) a physical copy of the original component and stores the physical copy in a different location in memory. Because the physical copy is stored in a location different from that of the original component, the component copier preferably preserves (in a step 340) the relative relationships among the nodes in the physical copy by causing pointers in the nodes of the physical copy to point to other nodes in the physical copy.

Next, in a step 350, the data updater (230 of FIG. 2A) applies the update transaction to the physical copy. In doing so, the data updater creates from the physical copy a new physical version of the original component. The original component can now be thought of as an out-of-date version, as it remains unaffected by the update transaction.

Next in a step 360, the pointer updater (240 of FIG. 2A) employs an atomic word write to revise a component pointer to cause the pointer to point to the new physical version instead of the original component (now, the out-of-date version). As stated previously, the component pointer is associated with a node in the database or a root thereof and points to the entire affected component. Revising the component pointer causes future transactions to be routed toward, to traverse the structure of, the new physical version of the component.

At this point, the update transaction has been fully executed and applied to the new physical version. Accordingly, the method 300 ends in an end step 370.

As described above, the present invention further provides systems and methods for performing lookups (finds), inserts into and deletes from a T-tree index that has been physically versioned. One embodiment of a find method will now be described in detail.

Each node in the tree has a latch associated with it which is obtained in exclusive mode to prevent concurrent updates. Due to physical versioning, the latch on a node is never obtained in shared mode. The tree itself has a tree latch, which is obtained (instead of node latches) by complicated structure modification operations. All update operations acquire the tree latch in shared mode. In the present invention, this latch serves to (1) simplify the presentation of the methods of the present invention and (2) prevent certain operations from having to obtain a large number of node latches. While some concurrency is important, it must be balanced against the overhead of latch acquisition.

It is assumed that each node, in addition to balance information about the relative heights of its subtrees, also contains a version bit that indicates if the node is versioned. This bit is 1 if a newer copy of this node has been linked into the tree in its place. Only updaters read and write the version bit. Furthermore, a new version of a node is created only when a key value is inserted or deleted from the node or the node is involved in a rotation. Updates to balance information and child pointers in a node are performed directly on the node, and no new version is created.

Table I sets forth "Find," one embodiment of a method for traversing the tree to find the smallest key greater than or equal to ($\geq$) a search key. Other search modes (e.g., >,=) can be supported via straightforward extensions—the mode$\geq$is considered since it illustrates the overall method. "Find" takes the following arguments:

stack: The stack contains the nodes on the path from the root to the current node of "Find." "Find" starts tree traversal from the top node of the stack; if the stack is empty, the root of the tree is assumed.

search_key: The key value being sought.

lock_mode: This flat indicates whether an exclusive lock, shared lock, or neither should be obtained on the key returned by "Find."

latch_mode: If this flag is True, then the node at which "Find" terminates is latched exclusively.

If lock_mode is None (indicating no lock), and latch_mode is false, "Find" is assumed to be called on behalf of a read-only transaction. In this case, no latches or locks are obtained, and no checks are made to determine if nodes are versioned. The reason for this is that a read-only transaction only needs to see the effects of updates that completed before it began. Update transactions, on the other hand, look up a key value in the index by invoking "Find" with lock_mode set to shared and latch-mode set to False. In "Find," right_ancestor (stack) is the topmost node in stack whose left child is also in stack.

TABLE I

The basic "Find" method

Find (stack, search_key, lock_mode, latch_mode)
proceed down the tree, beginning with the topmost node in stack,
pushing nodes onto stack until a node bounding search_key TABLE I-continued The basic "Find" method

```
is found, or until the next node to be visited is null;
node = top of stack; /* at end of the above traversal */
if search_key <= max_key (node) then
    satisfying_key = smallest key in node greater than or equal
        to search-Key;
else
    satisfying_key = smallest key in right_ancestor (stack);
if lock_mode == None and latch_mode == False then
    /* read-only transaction -- is OK if node is versioned */
    return (satisfying_key, ptr in index entry for satisfying_key);
if lock_mode not equal to None then
    obtain appropriate lock on satisfying_key;
if latch_mode == True then
    obtain S latch on tree;
    obtain X latch on node;
    /* Validate node before returning */
if 1) versioned (node)
    or 2) search_key < min_key (node) and left child not equal to
null
    or 3) search_key > max_key (node) and (right child not equal to
        null or versioned (right_ancestor (stack))) then
        release lock and latches just obtained;
        return Find (LSA (stack), search_key, lock_mode, latch_mode);
else
        return (satisfying_key, ptr in index entry for satisfying_key);
```

Whether called on behalf of updaters or readers, "Find" performs a "fuzzy" traversal of the tree. By "fuzzy," it is meant that "Find" does not obtain latches on its way down and does not check whether a node has been versioned until it reaches the node containing the satisfying key or a leaf or a semi-leaf node that should contain the search key (recall that all searches are greater than or equal to). After obtaining appropriate locks and latches based on input parameters (note that the lock is obtained before the latch is obtained to prevent deadlocks involving latches and locks), validation is performed to determine if the satisfying key value is indeed the key value to be returned. The reason to perform validation is that concurrent updaters may have inserted/deleted index entries while "Find" was obtaining locks/latches. Since every updater creates a new version of a node when inserting/deleting an index entry into/from the node, "Find" first checks to see if node has been versioned. Even if node were not versioned, if search_key<min_key (node), then a non-dull left child of node could contain a newly inserted key value between search_key and min_key (node), and this (instead of min_key (node)) would be the appropriate key value to be returned by "Find." Similarly, if search_key>max_key (node), then a right child may be added to node or the smallest key value in right_ancestor (stack) may be deleted, and thus it would no longer be the appropriate key value to return.

If any of the three validation conditions do not hold, "Find" restarts from the Lowest Stable Ancestor ("LSA") in stack. The LSA is the node farthest from the root of the tree (and thus the highest node in stack) that has not been versioned since it was visited by the find. LSA (stack) is obtained from stack by popping each node and checking its versioned bit until an unversioned node is found (in case all nodes in stack are versioned, then they are all popped and the latest version of the root node is pushed onto stack). Restarting from the LSA is an optimization (any node can provide a point from which to restart), and the intuition for it is based on the observation that no target key can escape from a subtree without modifying, and therefore versioning, the root of that subtree.

Note that restarting from the LSA above implies that termination of the method is probablistic, but this is true of every scheme that follows an unlatch-lock-validate model. "Find" can be further optimized by checking if node is versioned before obtaining any locks or latches—this way, if node was versioned, the overhead of obtaining locks and latches can be avoided, and "Find" can restart earlier.

Index scans can be implemented by caching the key value returned by the last call to "Find" and the value of stack at the end of the last "Find" operation (in an iterator structure), and then repeatedly invoking a variant of "Find" designed to locate a strictly larger key (the structure of which should be apparent from an examination of the "Find" method set forth in Table I), with the cached values of stack and the key value (lock_mode and latch_mode are set as for the first "Find" call for read-only and update transactions).

"Find" is also useful for implementing insertion, deletion and toggling of key values from the index. Toggling pointers in the index can be achieved by first invoking "Find" (with the key value for the pointer to be toggled, lock_mode and latch_mode are set as for the first "Find" call for read-only and update transactions).

"Find" is also useful for implementing insertion, deletion and toggling of key values from the index. Toggling pointers in the index can be achieved by first invoking "Find" with the key value for the pointer to be toggled, lock_mode set to None (a lock on the item is already held) and latch_mode set to True. Once the node containing the key value is latched by "Find" in exclusive mode, the index entry for the key value is over-written by the new pointer and the latch on the node is released.

The following describes how inserts on the index are implemented. The act of versioning a node consists of setting the versioned bit to one and adding the node to the physical ager's list. This always occurs after the node has been linked into the tree structure, but before the latch or next-key lock is released. From the perspective of other operations, a node is considered versioned if its versioned bit has been set to one.

Next, an insert procedure is described. Insert first invokes "Find" with the key value to be inserted key_val, and input parameters lock_mode set to exclusive and latch_mode set to True (stack is set to the root of the tree). This ensures that an X lock on the next key value is obtained and a latch on the node involved in the insert is also held. The lock on the next key value is released at the end of the insert procedure once the key has been inserted. Note that an X lock on key_val is already held when the insert call is made. Also, to permit more concurrency, it is possible to obtain an IX lock instead of an X lock on the next key value.

Let N be the node on which "Find" obtains an X latch. The following three cases are considered:

1. N bounds key_val and has room: A copy of N, say N', is created and key_val is inserted into it. A latch on N's parent is obtained and the pointer to N is toggled to point to N'. Node N is then versioned and all latches are released. Note that N's parent can be determined from stack. To ensure that updates are reflected in the most current version of the tree, it is important that N's parent must not be an old version. Thus, after the latch on N's parent is obtained, it is checked to see if it has been versioned. If this is the case, then (after releasing the latch), the tree is retraversed from the root to N to determine N's most current parent, and a latch on N's most current parent is obtained. This process is repeated until a latch on N's most current parent (that has not been versioned) is obtained.

2. N does not bound key_val: In this case, if there is room in N, then key_val is inserted as described in Case 1, otherwise, a new node containing key_val is allocated, a latch on the node is obtained and the left/right child of N is set to point to the newly allocated node.

3. N bounds key_val and does not have room: If the left child of N is null, then two nodes $N_1$ and $N_2$ are allocated: $N_1$ is a copy of N containing key_val but not containing the leftmost key in N and the left child of $N_1$ is set to $N_2$. $N_2$ simply contains the leftmost key in N. Latches are obtained on both $N_1$ and $N_2$. After obtaining a latch on N's parent, the pointer to N is toggled to point to $N_1$ and N is versioned.

If the left child of N is not null, then, after releasing the latch on N, the tree latch is obtained in exclusive mode. If N has been versioned or its left child has become null in between releasing the latch on N and obtaining the tree latch, the tree latch is released and insert restarts again by invoking "Find" from the LSA with latch_mode equal to True and lock_mode equal to None (a lock on the next key value is already held). If N has not been versioned and its left child remains non-null, then the following actions are taken.

Let $N_1$ be the node that contains the largest key value in the left subtree of N. If $N_1$ has room, then a copy of $N_1$ is made, the leftmost key value in N is inserted into the copy, the pointer in $N_1$'s parent is toggled to the new version and $N_1$ is versioned (a node latch is not needed here, since a tree latch is already held.) If $N_1$ has no room, then a new node containing only the leftmost key value in N is allocated and $N_1$'s right child is set to point to the newly allocated node. After this is completed, a copy of N is made from which the leftmost key value is deleted, key_val is inserted and N's parent's pointer to N is toggled to point to the new copy, following which N is versioned.

Note in the third step above that, by inserting the leftmost key value in N into N's left subtree before deleting it from N, any "Find" traversing the tree is guaranteed to see the key. A "Find" or an index scan may, however, see the key twice. For "Find," this is not a problem, since the traversal would have followed the same path irrespective of whether it encountered N or its new copy. For an index scan, this case can be handled by ignoring key values that are less than or equal to the previous key value returned.

In case a new node that is not a version of an existing node is allocated, the T-tree may need to be balanced, which in turn may require rotations to be performed. The insert procedure described above ensures that every time a new node is allocated, latches are obtained and held on both the newly allocated node and the parent, or a tree latch is held. In case a tree latch is held, the traversal upwards toward the root is simply performed as described above (the only difference is that every time a parent node, is accessed, a check is made to see if it is versioned, and if it is, then the tree is retraversed to determine the parent). In the case that the tree latch is not held, then before a parent node is examined to determine if it can be rotated, a latch is obtained on it (retraversing may be required if, after obtaining the latch, it is determined that the parent has been versioned).

Note that latches on tree nodes are obtained in a bottom-up fashion. Furthermore, no node latches are held when an attempt is made to acquire the tree latch either exclusively or in shared mode at the begging of an update operation. Thus, a deadlock involving only latches is not possible. (Locks are not acquired while holding a latch, so latch-lock deadlocks are also not possible).

While traversing the tree upwards the root, balances on the appropriate nodes on the path are adjusted to account for the newly allocated node. Note that these can be updated in place, since readers never examine balance information. If the updated balance indicates a height difference of greater than one at a node, then a rotation is performed at this node.

Figure 4A:
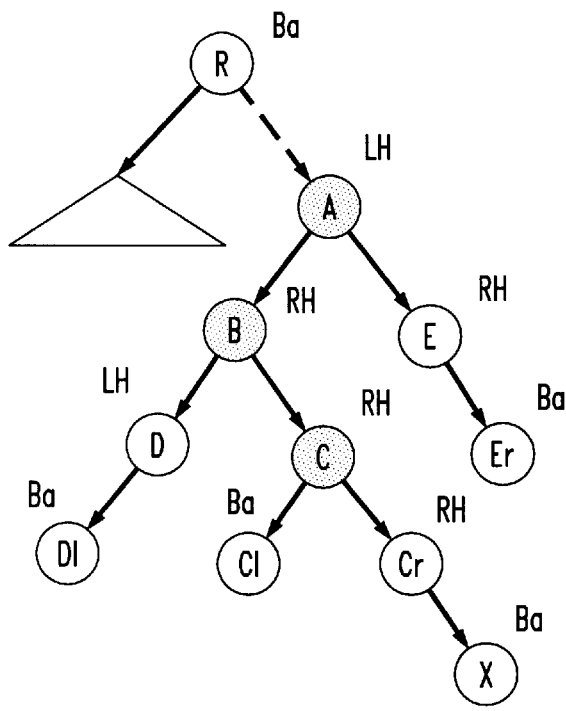
FIGS. 4A and 4B illustrate an exemplary LR rotation.
Figure 4B:
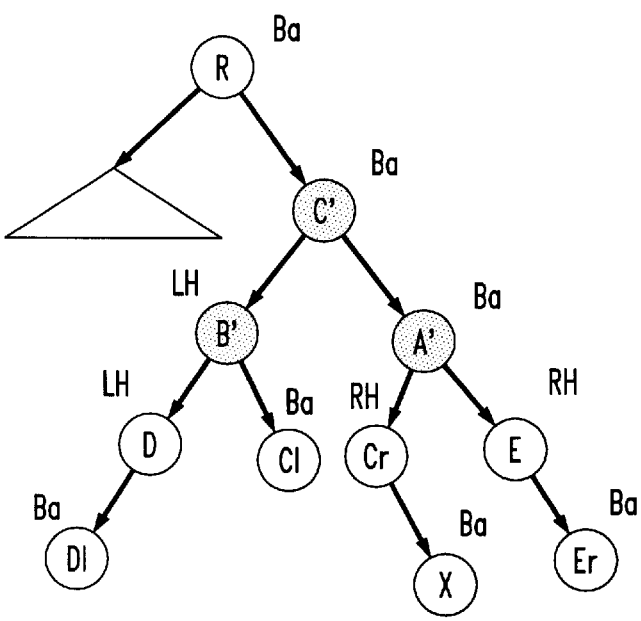

FIGS. 4A and 4B illustrate an example of an LR rotation. Balance information stored in a node indicates the relative heights of the node's subtree and can be either left heavy ("LH"), right heavy ("RH") or balanced ("Ba"). An LR rotation is performed when the node being considered has a balance of LH, and the new balance in the node that was examined before it was set to RH.

FIG. 4A depicts the state of the tree after a new node X has been allocated and the node being examined during balancing is A. Note that latches are held for recovery purposes on all nodes on the path from X to A. When performing an LR rotation rooted at node A, the following steps are performed. Copies A', B' and C' of nodes A, B, and C, respectively are first made. The children and balances for the nodes are set as shown in FIG. 4B. Finally, a latch on R is obtained and the pointer to A is toggled to point to C', and nodes A, B and C are versioned.

The balancing is completed once a rotation is performed or the balance on the node being examined is set to Ba, at which point all the latches are released.

It next becomes important to determine when the out-of-date original component is no longer needed. Once the out-of-date original component is no longer needed, the memory space in which it is stored can be released, or "de-allocated" for reallocation and use by other data. De-allocation of unrequired memory is particularly important when the memory in question is main memory, because it is relatively expensive.

Figure 5:
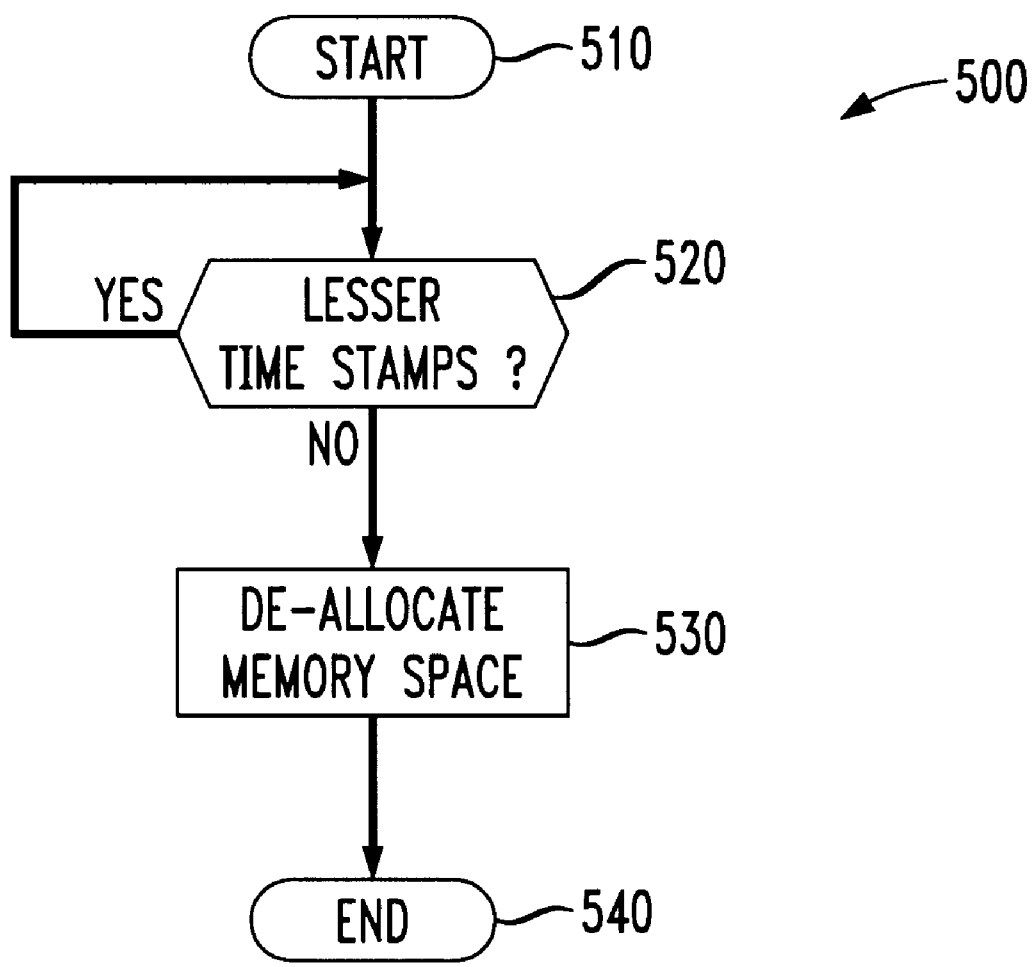
FIG. 5 illustrates a flow diagram of one embodiment of a method of aging the database that was physically versioned by carrying out the method of FIG. 3.

Turning now to FIG. 5, illustrated is a flow diagram of one embodiment of a method of aging the database that was physically versioned by carrying out the method of FIG. 3. The method, generally designated 500, begins in a start step 510.

Once multiple physical versions of a given component exist in a database, it becomes desirable to determine when the elder of the multiple versions can be disregarded. This is achieved in the illustrated embodiment by means of a physical ager (250 of FIG. 2A) operating with a time stamp. As described above in conjunction with FIG. 3, update transactions are assigned a time stamp. Likewise, read-only transactions are assigned a time stamp.

Out-of-date original components can be disregarded and their memory space released when there have been applied to the database all read-only transactions having a time stamp less than the time stamp associated with the update transaction that caused the original components to be superseded.

Accordingly, the method 500 contains a decisional step 520 in which the physical ager examines the time stamp of all pending read-only transactions and determines whether any pending read-only transactions have a lesser time stamp. If so (YES branch of the decisional step 520), the method 500 circles back and reexamines the pending read-only transactions as they are applied to the database.

If not (NO branch of the decisional step 520), the memory space of the corresponding out-of-date original component is de-allocated (released for storage of other data) in a step 530. The method ends in an end step 540.

With the physical aging scheme presented above, treating an entire scan as a single operation could result in long delays in the aging of data. This problem can be alleviated by decomposing a scan into a number of smaller operations as follows. With every scan, two bits are maintained—a retraverse bit and an in-progress bit. The retraverse bit is used by the physical ager to force the scan to perform a retraversal of the tree. The "Next" operation for a scan first sets the in-progress bit to 1 and checks to see if the retraverse bit for it has been set to 1. If so, it discards stack (cached from the previous "Next" call), sets the retraverse bit to 0, obtains a new physical timestamp and retraverses the tree from the current root node. Before returning, "Next" sets the in-progress bit to 0. To reclaim data held up by a long running scan of the database, the physical ager notes the current physical timestamp then sets the retraverse bit for the scan to 1. It then waits until the retraverse bit or the in-progress bit for the scan becomes 0, following which it frees data assuming the physical timestamp for the scan is the maximum of noted timestamp and the scan's current physical timestamp.

Although the present invention and its advantages have been described in detail, those skilled in the art should understand that they can make various changes, substitutions and alterations herein without departing from the spirit and scope of the invention in its broadest form.

What is claimed is:

1. A processing system for use with a database of data records organized into components, said database stored in a memory, comprising:
    a component copier that creates a physical copy of an original component to be affected by an update transaction to be applied to said database and that causes pointers in nodes of said physical copy to point to other nodes in said physical copy;
    a data updater, associated with said component copier, that applies said update transaction to said physical copy to create therefrom a new physical version, said original component remaining unaffected by said update transaction;
    a pointer updater, associated with said data updater, that employs an atomic word write to revise a component pointer, associated with said database, to cause said pointer to point to said new physical version; and
    a physical ager that de-allocates memory space occupied by said original component after there have been applied to said database all transactions having a physical time stamp less than a time stamp associated with said update transaction.

2. The processing system as recited in claim 1 wherein said database is organized as a tree.

3. The processing system as recited in claim 2 wherein said tree is selected from the group consisting of:
    a B-tree,
    a T-tree, and
    a hash table.

4. The processing system as recited in claim 1 wherein said pointer is associated with a parent of said original component.

5. The processing system as recited in claim 1 wherein said pointer is located without said original component.

6. The processing system as recited in claim 1 wherein a read-only transaction to be applied to said database is precluded from traversing said new physical version until said update transaction is fully executed.

7. A method of physically versioning a database of data records organized into components, said database stored in a memory, comprising the steps of:
    creating a physical copy of an original component to be affected by an update transaction to be applied to said database;
    causing pointers in nodes of said physical copy to point to other nodes in said physical copy;
    applying said update transaction to said physical copy to create therefrom a new physical version, said original component remaining unaffected by said update transaction;
    employing an atomic word write to revise a component pointer, associated with said database, to cause said pointer to point to said new physical version; and
    de-allocating space occupied by said original component after there have been applied to said database all transactions having a physical time stamp less than a time stamp associated with said update transaction.

8. The method as recited in claim 7 wherein said database is organized as a tree.

9. The method as recited in claim 8 wherein said tree is selected from the group consisting of:
    a B-tree,
    a T-tree, and
    a hash table.

10. The method as recited in claim 7 wherein said pointer is associated with a parent of said original component.

11. The method as recited in claim 7 wherein said pointer is located without said original component.

12. The method as recited in claim 7 further comprising the step of precluding a read-only transaction to be applied to said database from traversing said new physical version until said update transaction is fully executed.

13. A main memory database system, comprising:
    a database of data records stored in a main memory and organized into a tree of components; and
    a main memory database management system having a transaction processing controller that receives and processes transactions on ones of said data records, said transactions classified either update or read-only, said transaction processing controller including:
        a component copier, associated with said transaction processing controller, that creates a physical copy of an original component to be affected by an update transaction to be applied to said database and that causes pointers in nodes of said physical copy to point to other nodes in said physical copy,
        a data updater, associated with said component copier, that applies said update transaction to said physical copy to create therefrom a new physical version, said original component remaining unaffected by said update transaction,
        a pointer updater that employs an atomic word write to revise a component pointer, associated with said database, to cause said pointer to point to said new physical version, and
        a physical ager that de-allocates memory space occupied by said original component after there have been applied to said database all transactions having a physical time stamp less than a time stamp associated with said update transaction.

14. The database system as recited in claim 13 wherein said tree is selected from the group consisting of:
    a B-tree,
    a T-tree, and
    a hash table.

15. The database system as recited in claim 13 wherein said pointer is associated with a parent of said original component.

16. The database system as recited in claim 13 wherein said pointer is located without said original component.

17. The database system as recited in claim 13 wherein a read-only transaction to be applied to said database is precluded from traversing said new physical version until said update transaction is fully executed.

* * * * *